United States Patent
Krüger et al.

(10) Patent No.: US 11,274,027 B2
(45) Date of Patent: Mar. 15, 2022

(54) DISPENSER HAVING A CARTRIDGE HOLDER

(71) Applicant: Freezio AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: FREEZIO AG, Amriswil (CH)

( * ) Notice: Subject to any disclaimer, the term of this patent is extended or adjusted under 35 U.S.C. 154(b) by 67 days.

(21) Appl. No.: 16/368,016

(22) Filed: Mar. 28, 2019

(65) Prior Publication Data

US 2019/0284037 A1    Sep. 19, 2019

Related U.S. Application Data

(63) Continuation of application No. 16/069,817, filed as application No. PCT/EP2017/050561 on Jan. 12, 2017, now Pat. No. 11,021,358.

(30) Foreign Application Priority Data

| Jan. 12, 2016 | (DE) | .................. | 102016200254.6 |
| Jul. 1, 2016 | (DE) | .................. | 102016212012.3 |
| Jul. 1, 2016 | (DE) | .................. | 102016212013.1 |
| Sep. 27, 2016 | (DE) | .................. | 102016218507.1 |
| Sep. 27, 2016 | (DE) | .................. | 102016218509.8 |
| Sep. 29, 2016 | (DE) | .................. | 102016218884.4 |

(51) Int. Cl.
*A47J 31/40* (2006.01)
*B67D 1/00* (2006.01)
(Continued)

(52) U.S. Cl.
CPC .............. *B67D 1/0079* (2013.01); *A23L 2/54* (2013.01); *A47J 31/0673* (2013.01);
(Continued)

(58) Field of Classification Search
CPC .. A47J 31/407; A47J 31/4425; A47J 31/4492; B67D 1/0079; B67D 1/0022;
(Continued)

(56) References Cited

U.S. PATENT DOCUMENTS

| 4,314,768 A | 2/1982 | Goglio et al. |
| 4,323,171 A | 4/1982 | Whorton, III et al. |

(Continued)

FOREIGN PATENT DOCUMENTS

| CA | 2556421 C | 1/2013 |
| DE | 29825074 U1 | 9/2004 |

(Continued)

OTHER PUBLICATIONS

Election/Restriction Office Action dated Dec. 19, 2019, U.S. Appl. No. 16/069,817, filed Jul. 12, 2018.
(Continued)

*Primary Examiner* — Brian W Jennison
(74) *Attorney, Agent, or Firm* — The Dobrusin Law Firm, P.C.; Daniela M. Thompson-Walters

(57) ABSTRACT

The invention relates to a dispenser having a cartridge holder.

18 Claims, 7 Drawing Sheets

(51) Int. Cl.
| | |
|---|---|
| *B67D 7/02* | (2010.01) |
| *B67D 1/04* | (2006.01) |
| *A47J 31/06* | (2006.01) |
| *A47J 31/36* | (2006.01) |
| *B65D 51/22* | (2006.01) |
| *B65D 85/804* | (2006.01) |
| *A23L 2/54* | (2006.01) |
| *A47J 31/44* | (2006.01) |
| *B67D 1/08* | (2006.01) |
| *B65D 51/28* | (2006.01) |

(52) U.S. Cl.
CPC ........ *A47J 31/3628* (2013.01); *A47J 31/407* (2013.01); *A47J 31/4425* (2013.01); *A47J 31/4492* (2013.01); *B65D 51/223* (2013.01); *B65D 51/226* (2013.01); *B65D 85/8043* (2013.01); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *A47J 31/3695* (2013.01); *B65D 51/2835* (2013.01); *B67D 2001/0811* (2013.01); *B67D 2001/0812* (2013.01)

(58) Field of Classification Search
CPC ...... B67D 1/0046; B67D 1/0078; B67D 1/04; B67D 1/045; B67D 7/0227; B67D 7/0233; B67D 2001/0811; B67D 2001/0812
See application file for complete search history.

(56) References Cited

U.S. PATENT DOCUMENTS

| | | | |
|---|---|---|---|
| 4,376,496 A | 3/1983 | Sedam et al. | |
| 4,581,239 A | 4/1986 | Woolman | |
| 4,708,266 A | 11/1987 | Rudick | |
| 4,829,889 A | 5/1989 | Takeuchi | |
| 4,938,387 A | 7/1990 | Kervefors et al. | |
| 5,435,462 A | 7/1995 | Fujii | |
| 5,494,194 A | 2/1996 | Topper et al. | |
| 5,836,482 A | 11/1998 | Ophardt | |
| 5,876,995 A | 3/1999 | Bryan | |
| 5,897,899 A | 4/1999 | Fond | |
| 6,971,549 B2 | 12/2005 | Leifheit | |
| 7,597,922 B2 | 10/2009 | Cheng | |
| 8,596,498 B2 | 12/2013 | Werner | |
| 2002/0007671 A1 | 1/2002 | Lavi | |
| 2002/0078831 A1 | 6/2002 | Cai | |
| 2002/0130140 A1 | 9/2002 | Cote | |
| 2002/0144603 A1 | 10/2002 | Taylor | |
| 2002/0193777 A1 | 12/2002 | Aneas | |
| 2003/0000964 A1 | 1/2003 | Schroeder et al. | |
| 2003/0036725 A1 | 2/2003 | Lavi | |
| 2003/0070554 A1 | 4/2003 | Cortese | |
| 2003/0097314 A1 | 5/2003 | Crisp, III et al. | |
| 2004/0188459 A1 | 9/2004 | Halliday | |
| 2004/0191372 A1 | 9/2004 | Halliday et al. | |
| 2005/0077318 A1 | 4/2005 | Macler | |
| 2005/0151764 A1 | 7/2005 | Grady | |
| 2005/0160919 A1 | 7/2005 | Balkau | |
| 2005/0269362 A1 | 12/2005 | Guerrero | |
| 2006/0047250 A1 | 3/2006 | Hickingbotham | |
| 2006/0138177 A1 | 6/2006 | Wauters et al. | |
| 2006/0174769 A1 | 8/2006 | Favre | |
| 2006/0249536 A1 | 11/2006 | Hartman et al. | |
| 2007/0175334 A1 | 8/2007 | Halliday | |
| 2007/0199453 A1 | 8/2007 | Rasmussen | |
| 2008/0029541 A1 | 2/2008 | Wallace et al. | |
| 2008/0302252 A1 | 12/2008 | O'Brien | |
| 2009/0145926 A1* | 6/2009 | Klopfenstein | B67D 1/0044 222/129.4 |
| 2009/0183640 A1 | 7/2009 | Ozanne | |
| 2009/0199518 A1 | 8/2009 | Deuber | |
| 2009/0308488 A1 | 12/2009 | Bennett | |
| 2010/0064899 A1 | 3/2010 | Aardenburg | |
| 2010/0107889 A1 | 5/2010 | Denisart | |
| 2010/0147154 A1 | 6/2010 | De Graaff | |
| 2010/0180774 A1 | 7/2010 | Kollep | |
| 2010/0206177 A1 | 8/2010 | Ricotti | |
| 2011/0000377 A1 | 1/2011 | Favre | |
| 2011/0110180 A1 | 5/2011 | Snider | |
| 2011/0166910 A1 | 7/2011 | Marina et al. | |
| 2011/0210140 A1 | 9/2011 | Girard | |
| 2012/0052159 A1 | 3/2012 | Doleac | |
| 2012/0090473 A1 | 4/2012 | Deuber | |
| 2012/0121780 A1 | 5/2012 | Lai et al. | |
| 2012/0199011 A1 | 8/2012 | Cheng | |
| 2012/0199227 A1 | 8/2012 | Manser | |
| 2012/0207893 A1 | 8/2012 | Krüger | |
| 2012/0231124 A1* | 9/2012 | Kamerbeek | B65D 85/8043 426/112 |
| 2013/0055903 A1 | 3/2013 | Deuber | |
| 2013/0061762 A1 | 3/2013 | Carr et al. | |
| 2013/0062366 A1 | 3/2013 | Tansey | |
| 2013/0084376 A1 | 4/2013 | Fischer | |
| 2013/0129870 A1 | 5/2013 | Novak | |
| 2013/0224340 A1 | 8/2013 | BenDavid | |
| 2013/0239820 A1 | 9/2013 | Baldo | |
| 2013/0340626 A1 | 12/2013 | Oh | |
| 2014/0033934 A1 | 2/2014 | Chou | |
| 2014/0130678 A1 | 5/2014 | Frydman | |
| 2014/0227403 A1 | 8/2014 | Fischer | |
| 2014/0326750 A1 | 11/2014 | Marina | |
| 2014/0338542 A1 | 11/2014 | Smith | |
| 2014/0345472 A1 | 11/2014 | Fritz | |
| 2015/0050392 A1 | 2/2015 | Stonehouse et al. | |
| 2015/0216353 A1 | 8/2015 | Polti | |
| 2015/0238039 A1 | 8/2015 | Fischer | |
| 2015/0335197 A1 | 11/2015 | Moon | |
| 2015/0374025 A1 | 12/2015 | Evans | |
| 2016/0068334 A1 | 3/2016 | Cafaro | |
| 2016/0272414 A1 | 9/2016 | Roberts | |
| 2016/0309948 A1 | 10/2016 | Dees | |
| 2016/0338527 A1 | 11/2016 | Burrows | |
| 2016/0367066 A1 | 12/2016 | Brandsma | |
| 2017/0135516 A1 | 5/2017 | Fantappie | |
| 2018/0257856 A1 | 9/2018 | Oliver | |
| 2019/0016579 A1 | 1/2019 | Kruger | |
| 2019/0031485 A1 | 1/2019 | Kruger | |
| 2019/0127200 A1 | 5/2019 | Kruger | |
| 2019/0241421 A1 | 8/2019 | Kruger | |
| 2019/0248639 A1 | 8/2019 | Kruger | |

FOREIGN PATENT DOCUMENTS

| | | |
|---|---|---|
| DE | 102009049945 A1 | 4/2011 |
| DE | 102009052513 A1 | 5/2011 |
| EP | 1671568 A2 | 6/2006 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2374733 A1 | 10/2011 |
| EP | 2268175 B1 | 5/2013 |
| EP | 2923772 A1 | 9/2015 |
| GB | 1256247 A | 12/1971 |
| GB | 2020631 A | 11/1979 |
| GB | 2033333 A | 5/1980 |
| GB | 2416757 A | 2/2006 |
| JP | 2006516398 A | 7/2006 |
| JP | 2008021294 A | 1/2008 |
| RU | 2346882 C2 | 1/2006 |
| WO | 1996/036556 A1 | 11/1996 |
| WO | 98/05586 A1 | 2/1998 |
| WO | 01/21292 A1 | 3/2001 |
| WO | 2004067386 A | 8/2004 |
| WO | 2004/099060 A2 | 11/2004 |
| WO | 2005/079361 A2 | 9/2005 |

(56) References Cited

FOREIGN PATENT DOCUMENTS

| WO | 2006/005401 A2 | 1/2006 |
| WO | 2007/035820 A2 | 3/2007 |
| WO | 2011/084603 A1 | 7/2011 |
| WO | 2013/036564 A2 | 3/2013 |
| WO | 2013114346 A2 | 8/2013 |
| WO | 2013139864 A1 | 9/2013 |
| WO | 2014/200481 A1 | 12/2014 |
| WO | 2015056022 A1 | 4/2015 |
| WO | 2015/094774 A1 | 6/2015 |
| WO | 2017/121796 A1 | 7/2017 |

OTHER PUBLICATIONS

Russian Office Action dated Sep. 22, 2020, Application No. 2018128620/28.
Third Party Observation dated Jan. 20, 2020, Application No. EP20170700340, Publication No. EP3402736.
Canadian Office Action dated May 14, 2020, Application No. 3,038,296.
Office Action for co-pending U.S. Appl. No. 16/069,817 dated May 20, 2020.
Notification of Refusal for Japanese Patent Application No. 2019-062721, drafted Nov. 26, 2020 and dated Dec. 1, 2020.
Office Action and Notice of References Cited for U.S. Appl. No. 16/069,752 dated Jan. 7, 2021.
International Search Report for International Application PCT/EP2017/050561, dated Apr. 21, 2017.
International Preliminary Report on Patentability for International Application PCT/EP2017/050561, dated Mar. 12, 2018.

\* cited by examiner

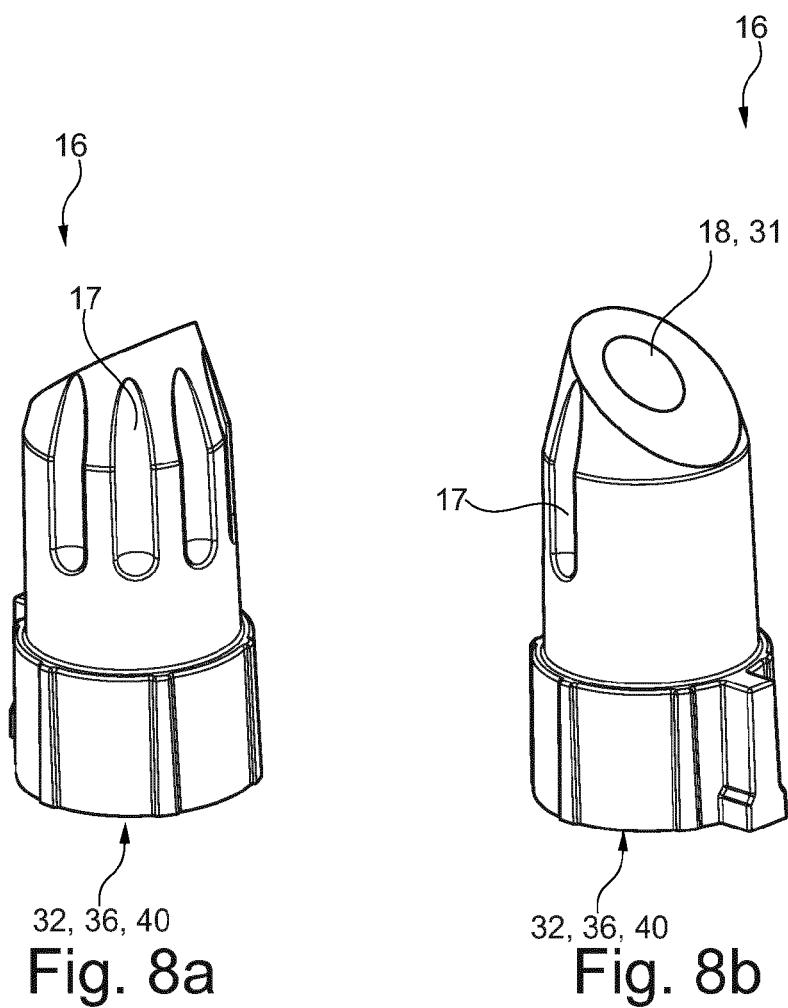

DISPENSER HAVING A CARTRIDGE HOLDER

BACKGROUND

The invention relates to a dispenser having a cartridge holder.

Such systems are known in principle from the prior art, for example from EP 2 017 221 A1 and WO 96/36556 A1, and are used to produce beverages from pre-portioned cartridges. The production of beverages with such systems is extremely convenient for the user since he merely has to insert a cartridge into the dispenser and initiate a starting process. The dispenser, also known as a beverage preparation machine, then undertakes the production of the beverage in a fully automated manner, i.e., in particular, the foodstuff substrate or beverage substrate is blended with a predetermined quantity of liquid, in particular cold and carbonated water, and conveyed into a drinking vessel. In this way, in particular mixed drinks can be produced much more easily, quickly and with less effort for the user. The user can choose from a large number of different cartridges here, and so he can produce different beverages as desired.

The dispenser mentioned at the beginning is thus known from the prior art and is used to produce for example cold beverages by means of cartridges. It is important for the cartridge to be held securely in the dispenser such that no leaks, but also no back-contamination, takes place.

SUMMARY

Therefore, it was the object of the present invention to provide a dispenser which satisfies these demands. In particular, leak-free beverage production without back-contamination of the dispenser is intended to be made possible. At the same time, the dispenser is intended to afford a high level of ease of use and be cost-effective to realize. A further object of the present invention is to set the formation of foam on the beverage or foodstuff in a controlled manner.

The object is achieved by a dispenser having a cartridge holder which has at least one guide and/or twist prevention means for a cartridge and/or a cartridge receptacle.

The statements made with regard to this subject of the present invention apply equally to the other subjects of the present invention and vice versa.

The present invention relates to a dispenser having a cartridge holder which mounts the cartridge on the dispenser and supports and/or guides the cartridge. The cartridge has a cavity in which a beverage substrate and/or foodstuff substrate is located. This substrate is preferably liquid and in particular a concentrate and is mixed with a solvent, in particular water, to produce the beverage or foodstuff and then collected in a container, in particular a glass, which preferably stands on a support of the dispenser, said support being arranged beneath the holder. The beverage substrate and/or foodstuff substrate comprises preferably liquid premixing constituents for soft drinks, such as caffeinated, carbonated, fruity and/or sugary sodas and juices, beer (mixed) drinks, or other alcoholic or nonalcoholic (mixed) drinks.

According to the invention, a guide and/or twist prevention means is now provided on the cartridge holder. This ensures that the cartridge takes up a particular position relative to the dispenser at least with regard to a spatial direction and also prevents the cartridge from twisting before or during the production of the beverage or being inserted in an incorrect orientation. This also ensures that, if the cartridge is equipped with a product identifier which is intended to be read by an identifier detector of the dispenser, the identifier always faces the detector, thereby allowing reliable and error-free reading.

Preferably, the cartridge holder has a cutout which at least partially receives the cartridge and/or the cartridge receptacle. Preferably, the cutout in the cartridge holder and the cartridge or cartridge receptacle cooperate at least partially in a form-fitting manner and thus act as a support and/or twist prevention means. Preferably, the cutout extends as far as the edge, such that the circumference of the cutout is open at one point. The protuberance in the cartridge receptacle can be positioned there. Alternatively, the cutout has a protuberance for the protuberance on the cartridge receptacle.

Alternatively or additionally, the holder has a guide which cooperates with the circumference of the cartridge receptacle and/or the cartridge. This guide can be for example a standing collar which extends preferably in the peripheral region of the cutout in the holder. The guide extends preferably at right angles to the horizontal and prevents the cartridge from tipping relative to the vertical.

According to a preferred embodiment, the cutout and/or the guide have an opening for a protrusion/protuberance on the cartridge receptacle, this being able to act as a twist prevention means or as an additional stabilization means.

Preferably, the holder has a liquid connection. By way of this liquid connection, the solvent for producing the beverage is made available. The liquid connection of the holder is preferably connected to the liquid inflow in the cartridge receptacle, in particular in a liquid-tight manner. According to a further preferred embodiment of the present invention, provision is made for the liquid connection to be supplied with fluid which is cooled by a refrigeration unit, wherein the refrigeration unit is part of the dispenser or of a separate refrigerator operatively connected to the dispenser. Advantageously, it is thus possible for cold beverages to be produced even when the cartridge is not itself cooled and is at room temperature for example. The integration of the system into an existing refrigerator has the advantage that the existing refrigeration unit of the refrigerator can be co-used easily in an efficient manner for the dispenser. In particular, in what are known as "side-by-side" refrigerators (often also referred to as American refrigerators), sufficient installation space for integrating the dispenser can be found in the front. It is conceivable for the dispenser to be a retrofitting set for such a refrigerator. The refrigeration unit comprises preferably a compressor cooling unit, an absorber cooling unit or a thermoelectric cooler. According to a further preferred embodiment of the present invention, provision is made for the liquid connection to be supplied with fluid to which carbonic acid is added by a carbonator. It is conceivable for the carbonator to be part of the dispenser, and for the carbonator to have a receptacle for a CO2 cartridge and a feeding device for adding CO2 from the CO2 cartridge to the fluid. Advantageously, it is thus also possible to produce carbonated (soft) drinks with the system. Alternatively, it would also be conceivable for the carbonator to have an external CO2 connection. The fluid comprises in particular water, which is provided from a water pipe or a water tank of the dispenser by means of one or more pumps, preferably diaphragm pumps. The delivery of the water to the liquid connection is monitored preferably by means of a flow sensor, for example an ultrasonic flow sensor or a magnetic-inductive flow sensor.

According to the invention, provision is made for the holder to have a compressed-air outlet connected to a compressed-air source. The compressed-air outlet acts as a cartridge emptying device and serves to introduce compressed air from the outside into the cavity of the cartridge, with the result that the foodstuff substrate and/or beverage substrate is pushed out of the cavity into a mixing chamber of the cartridge receptacle. The compressed air is provided in particular by the dispenser. The cartridge receptacle has preferably a gas inlet which, upon insertion of the cartridge receptacle into the holder, is directly coupled to the compressed-air outlet of the holder. This has the advantage that back-contamination in the direction of the dispenser is effectively avoided because the pressure duct is immediately under pressure when the cartridge system is inserted into the holder and thus foodstuff substrate and/or beverage substrate is prevented from traveling in the direction of the dispenser and in particular in the direction of the compressed-air source. Starting from the cavity in the cartridge, the substrate can thus move only in the direction of the mixing chamber.

According to a further preferred embodiment of the present invention, provision is made for the holder to have a release element in order to transfer a piercing means of the cartridge receptacle from a retracted position into an extended position. The cartridge is closed preferably with a membrane, for example a sealing foil. The cartridge receptacle has preferably a piercing means which is displaceable between a retracted position, in which the piercing means is away from the membrane, and an extended position, in which the piercing means pierces the membrane and projects into the cavity. The cartridge is thus opened by the piercing means. In order to transfer the piercing means into the extended position, the holder has the release element. It is conceivable for the release element to comprise a fixed protrusion which, upon insertion of the cartridge system into the holder, comes into abutment against the piercing means and drives the piercing means into the extended position by way of a relative movement between the cartridge system and release element. Particularly preferably, the compressed-air outlet is integrated into the piercing means.

Preferably, the holder comprises a fastening flange which engages around the cartridge receptacle in a form-fitting and/or force-fitting manner during or after insertion into the holder. The fastening flange furthermore comprises a release mechanism which is configured such that actuation of the release mechanism results in the fastening flange engaging around the cartridge receptacle and/or in the fastening flange being shifted such that a relative movement between the cartridge receptacle and the release element in contact with the piercing means is generated, with the result that the piercing means is transferred from the retracted position into the extended position. The release mechanism comprises in particular a hand lever for the manual actuation thereof, wherein, preferably, the hand lever is configured to be rotatable about an axis of rotation substantially parallel to the longitudinal axis of the cartridge. Furthermore, the release mechanism preferably comprises a transmission which converts a rotary movement of the hand lever about the axis of rotation parallel to the longitudinal axis into a movement in translation substantially parallel to the longitudinal axis. Once the cartridge system has been inserted into the holder, the hand lever is actuated by the user, with the result that the cartridge system is firmly engaged around and shifted linearly towards the release element. The twist prevention means and the conversion of the rotary movement into the linear movement in translation ensure that the orientation of the cartridge relative to the dispenser remains constant. As a result, the reading of the product identifier, which is described in the following text, is advantageously made easier.

According to a further preferred embodiment of the present invention, provision is made for the dispenser to have an identifier detector for reading a product identifier on the cartridge and/or the cartridge receptacle, wherein the identifier detector is arranged preferably above and/or behind the holder. Preferably, the product identifier is embedded in a barcode, an RFID code, a QR code, a data matrix code, a color code, a hologram code or the like. Advantageously, automated reading of the product identifier is thus possible. The identifier detector comprises in particular an optical sensor, for example a CCD camera, which automatically reads the barcode or QR code or data matrix code when the cartridge has been inserted into the beverage preparation machine. Alternatively, the identifier detector comprises a transceiver antenna for automatically reading the RFID codes. Alternatively, it would be conceivable for the product identifier also to be embedded in other automatically readable computer chips. The term QR code includes, within the meaning of the present invention, in particular any data matrix code. In this regard, the terms QR code and data matrix code are used synonymously. Alternatively or additionally, it would also be conceivable for the product identifier to comprise a barcode, a dot code, a binary code, a Morse code, Braille code (embossed printing) or the like. The code can in this case also be embedded in a three-dimensional structure, for example a relief. The product identifier comprises in particular what is known as the product identification number, in particular a Universal Product Code (UPC), a European Article Number (EAN), a GS1 code, a Global Trade Item Number (GTIN) or the like. In this way, it is not necessary for a new code system to be introduced. In particular, the product identifier is covered by the GS1 standard. The product identifier is preferably printed and/or stuck directly onto the cartridge and/or introduced into the surface of the cartridge, for example by (laser) engraving, stamping or directly during the production of the cartridge. Alternatively, it would also be conceivable for the cartridge to be at least partially encased in a covering, for example a sleeve, on which the product identifier is arranged. The covering can also be adhesively bonded or welded to the cartridge. The covering or the sleeve could be produced from a plastic film, a textile or paper.

A further or preferred subject of the present invention is a dispenser which has a support for a container in which the finished beverage or foodstuff is collected, wherein the support is intended to be vertically adjustable and/or pivotable.

Preferably, the support is intended to be pivotable for example about an axis or about a point such that the container can be set tilted in particular when the finished beverage or the foodstuff flows in. As a result, it is possible to influence the formation of foam on the beverage. The support can be adjusted manually or by a motor. The dispenser can have a means, for example a camera, which determines the level of foam on the beverage or foodstuff, the tilt being changed accordingly, on the basis of the signal from this means. Further preferably, the cartridge which is used to produce the beverage or foodstuff can have information above the tilt to be set. According to yet another preferred embodiment, the cartridge has an identifier, using which it can be identified. As soon as the cartridge has been recognized, information about the desired tilt of the container is retrievable. The same goes for the container in which the beverage or foodstuff is collected. The latter can also have information and/or an identifier with which the desired tilt is able to be determined. Furthermore, the support is preferably vertically adjustable, such that the support is adaptable for example to different glass sizes and/or the formation of foam is able to be influenced by the length of the drop distance.

Furthermore, the present invention relates to a system having a cartridge receptacle and/or a cartridge, wherein the cartridge receptacle reversibly or irreversibly receives the cartridge, in particular partially. The cartridge has a cavity in which the beverage substance and/or foodstuff substance is located and which is hermetically sealed, in particular by the membrane, prior to beverage and/or foodstuff production. In order to produce the beverage and/or the foodstuff, the cartridge is then opened, in particular the membrane is pierced, and the substrate runs/flows, in particular supported by the introduction of compressed air into the cavity, into a mixing chamber of the cartridge receptacle, which also has an inflow for a diluent (also known as solvent), in particular a water inflow, which is mixed with the substrate in order to produce the finished beverage or foodstuff, which runs out of the mixing chamber through an outflow likewise provided on the cartridge receptacle. The volumetric flow of the solvent is in this case generally much greater than the volumetric flow of the substrate. The cartridge and the cartridge receptacle connected to the cartridge together form a cartridge system which is insertable into the holder of the dispenser.

Preferably, the flow cross section, i.e. the cross section which is available for the liquid to flow, in particular for the solvent flow and/or the mixture of solvent and substrate, is now provided such that, with regard to the direction of flow of the solvent, the flow rate is first of all slowed down and then accelerated again. The acceleration which is achieved by a flow cross section constriction takes place as far as possible after the solvent and the substrate have been blended.

According to a further preferred subject of the present invention, the mixing chamber has a protuberance. This protuberance projects preferably out of the circumference, in particular the lateral circumference, which extends between the two end sides of the cartridge receptacle. Preferably, the protuberance is part of the mixing chamber. Preferably, the circumference of the mixing chamber has a substantially circular shape and the protuberance projects out of this circular shape. According to a particularly preferred embodiment of the present invention, the outflow of the finished beverage or foodstuff is provided in the protuberance.

According to a further preferred subject of the present invention, the cartridge receptacle has a fastening and/or securing ring. This fastening and/or securing ring preferably receives the cartridge, which is fastened to the cartridge receptacle. Preferably, the fastening and/or securing ring is provided with a predetermined breaking point and/or predetermined deformation point at the mixing chamber. Before the production of a beverage or foodstuff, this point is destroyed and/or deformed, in particular irreversibly deformed. This can take place for example by the cartridge and the cartridge receptacle being moved relative to one another. As a result of the deformation and/or destruction, the cartridge receptacle can be used only once and/or the interconnection between the cartridge receptacle and the cartridge can no longer be released.

Preferably, at least one mixing element is provided in the mixing chamber, said mixing element ensuring that the solvent or the mixture of solvent and substrate is swirled. Preferably, the mixing element is provided as a protuberance and/or integral formation in the bottom of the mixing chamber. Preferably, the mixing element is designed such that carbonic acid which is dissolved in the solvent does not outgas or outgases only a little. Preferably, the mixing element is designed such that it exhibits only a slight pressure drop.

Preferably, the cartridge receptacle has a piercing means which perforates the membrane before the production of the beverage or foodstuff. This piercing means is designed for example as a spike which projects out of the bottom of the mixing chamber. The cartridge receptacle has preferably a spike guide in which the piercing means is mounted in a displaceable manner. In this way, the piercing means is displaceable between a retracted position, in which the piercing means is away from the membrane, and an extended position, in which the piercing means pierces the membrane and projects into the cavity of the cartridge.

Preferably, the piercing means has, on its outer circumference, at least one, preferably a plurality of indentations and/or protuberances, which serve as outflow for the substrate. The quantity and size of the indentations and/or protuberances depend preferably on the viscosity of the substrate. The outer wall of the piercing means is thus provided with at least one lateral channel for conveying the substrate in the direction of the mixing chamber when the membrane has been pierced. Through the lateral channel formed laterally on the piercing means, the substrate can then flow past the membrane in the direction of the mixing chamber. Preferably, a plurality of lateral channels are formed on the piercing means. The lateral channels are in particular each configured in the form of a groove that is open on one side. It is conceivable for the cross section of the lateral channels and/or the number of the lateral channels to be adapted to the viscosity of the substrate, such that the lateral channels control or limit the flow of the substrate in the direction of the mixing chamber. At a high viscosity, a plurality of lateral channels or lateral channels with a relatively large cross section are used, while, at a lower viscosity, fewer lateral channels or lateral channels with a smaller cross section are provided. Thus, a matching cartridge receptacle exists for each cartridge.

Preferably, a compressed-air line, in particular in the form of an internal duct, is integrated into the piercing means, wherein a compressed-air connection of the compressed-air line for connecting to a compressed-air source is formed on a side of the piercing means that is remote from the cartridge, said compressed-air connection being accessible in particular from outside the cartridge receptacle, and wherein a compressed-air outlet of the compressed-air line for blowing the compressed air into the cartridge is formed on a side of the piercing means that faces the cavity of the cartridge. Preferably, compressed air is already applied to the compressed-air connection when the cartridge system made up of the cartridge and cartridge receptacle is inserted into the holder, in order to prevent any back-contamination of the dispenser. Alternatively, the piercing means is moved from the retracted position into the extended position by the compressed air applied via the dispenser. Rather than compressed air, it is also possible for CO2 to be introduced into the cavity in order to transfer the substrate from the cavity into the mixing chamber.

Preferably, the piercing means thus has a channel which ends in or in the region of the tip. Through this channel, it is possible for a gas, in particular air or $CO_2$, to be blown into the cartridge in order to accelerate and/or to meter the dispensing of the substrate.

The system is preferably configured such that the compressed-air connection is coupled to the compressed-air outlet of the holder when the cartridge receptacle has been inserted into the holder and/or the release mechanism for the fastening flange is actuated. The compressed-air line is thus pressurized as early as possible such that back-contamination of the dispenser by the substrate is prevented.

Preferably, the inflow and the outflow are provided at opposite ends of the cartridge receptacle. Particularly preferably, the piercing means is provided in a manner aligned with the inflow and the outflow.

According to a further preferred subject of the present invention, the outlet is provided in a movable, in particular pivotable, manner on the mixing chamber, or has a means with which the outlet can be oriented, in particular in the direction of the side wall of the vessel which receives the finished beverage or foodstuff. This embodiment is advantageous in particular in the case of beverages or foodstuffs that tend to foam. The outlet can be moved manually or by a motor. In the event that the cartridge has an identification, the pivoting can take place automatically after the dispenser has recognized the cartridge. Furthermore, a means may be provided which determines the foam. On the basis of this analysis, the outlet can then be set.

The cartridge is produced preferably from plastic, in particular by a molding and/or blow-molding process. The cartridge has a side wall which has for example a round, rectangular, square, conical or oval cross section. A bottom is generally provided, in particular in one piece, at one end of the side wall. The side wall and optionally the bottom region define a cavity in which a beverage substrate and/or foodstuff substrate, in particular in liquid form, is provided. Provided at the other end of the wall region is a connecting region by way of which the cartridge is connected to the cartridge receptacle. This cartridge receptacle can be part of a dispenser or a component separate from the dispenser.

Preferably, the connecting region is provided such that it has at least one flange. The flange protrudes from the connecting region and projects from a wall region of the connecting region preferably at an angle, particularly preferably at right angles. In order to produce the beverage or foodstuff, the flange is oriented preferably horizontally. Preferably, the flange is made of solid material, i.e. not manufactured in a hollow manner. In particular, the flange is injection-molded.

Further preferably, the flange is provided with a positioning and/or covering means. The positioning means ensures that the cartridge can be arranged on the dispenser and/or on the cartridge receptacle only in a particular position, in particular at a particular angle of rotation, in particular with regard to the longitudinal center axis of the cartridge. The covering means covers a region, in particular a region through which the finished beverage or foodstuff flows out. Preferably, the positioning means and the covering means are identical.

Preferably, the positioning means and/or covering means is an indentation and/or protuberance which protrudes from the flange, in particular the circumference thereof. Preferably, the positioning means and/or covering means is provided in one piece with the flange. For example, the positioning means and/or covering means is configured as a lug which is integrally formed at one point on the circumference of the flange. The thickness of the positioning means and/or covering means corresponds in this case at least substantially to the thickness of the flange.

According to one preferred embodiment, a neck is provided between the wall region and the connecting region. This neck can have for example a round cross section. The neck represents the wall region of the connecting region. The flange adjoins the neck preferably at right angles.

Preferably, the membrane which closes, in particular hermetically seals, the cartridge before it is used, is provided on the flange, in particular the end face thereof, in particular in a sealed manner. To this end, the flange, in particular the end face thereof, can have a bead, in particular a bead in the form of a circular ring, which cooperates with the sealing tool during sealing. Preferably, the outer circumference of the membrane is less than the outer circumference of the flange.

Preferably, a fastening means is provided in the wall region and/or in the region of the neck. By way of this fastening means, the cartridge can be connected to a dispenser. The fastening means can be for example a groove in which a fastening means on the dispenser engages.

The cartridge receptacle can be connected fixedly to the cartridge or be a replacement part which is removed from the cartridge after the latter has been used, and is connected to a new cartridge. Preferably, the cartridge receptacle is made of plastic, in particular by injection-molding. Preferably, the cartridge receptacle is connected to a dispenser.

Preferably, the covering means, which is provided on the flange of the cartridge, covers the outflow of the cartridge receptacle.

Preferably, the flange on the cartridge, in particular the circumference thereof, cooperates in a sealing manner with the cartridge receptacle. To this end, the circumference of the flange can engage for example in a groove in the cartridge receptacle. This flange/groove connection can also serve as a force-fit, in order to prevent the cartridge from shifting relative to the cartridge receptacle during beverage or foodstuff production and the connection between the cartridge and cartridge receptacle losing its tightness.

According to one preferred embodiment, the cartridge and the cartridge receptacle are provided to be longitudinally displaceable with respect to one another, in particular before the membrane is pierced. As a result of this longitudinal displacement, the piercing means can then be brought into engagement with the membrane and pierce the latter.

Preferably, the cartridge and the cartridge receptacle are connected together in a rotationally fixed manner.

Preferably, the piercing means has a channel. Through this channel, a gas can be pushed into the cartridge, which pushes the beverage substrate and/or foodstuff substrate out of the cartridge, in particular into the mixing space of the cartridge receptacle.

A further subject of the present invention is a method for producing a beverage with the system according to the invention, characterized by the following steps:
    inserting a cartridge system made up of a cartridge and cartridge receptacle into the holder,
    establishing a fluidic connection between a fluid source of the dispenser and the inflow of the cartridge receptacle,
    establishing a compressed-air connection between a compressed-air source of the dispenser and a compressed-air connection of the cartridge receptacle,
    perforating the membrane by transferring the piercing means from the retracted position into the extended position,
    transferring the beverage substrate and/or foodstuff substrate from the cartridge into the mixing chamber by injecting compressed air into the cartridge through the compressed-air connection,
    injecting a diluent into the mixing chamber through the inflow, and discharging the beverage produced in the mixing chamber by blending the beverage substrate and/or foodstuff substrate with the diluent by means of the outflow.

Preferably, the diluent is cooled and/or carbonated before being injected into the inflow.

According to a preferred embodiment of the present invention, provision is made for the piercing means to be transferred from the retracted position into the extended position by a release element of the dispenser, wherein the cartridge receptacle is preferably moved against the fixed release element such that the piercing means is transferred from the retracted position into the extended position. As a result of the piercing means being transferred into the extended position, the membrane is perforated and the cartridge thus opened. The fixed release element merely has to move the cartridge system relative to the holder.

According to a further preferred embodiment of the present invention, provision is made, during or after the insertion of the cartridge system into the holder, for a fastening flange of the holder to be operated by a release mechanism that is actuable manually or by a motor, such that the fastening flange engages around the cartridge receptacle in a form-fitting and/or force-fitting manner, and/or such that the fastening flange is shifted such that a relative movement between the cartridge receptacle and the release element in contact with the piercing means is generated, with the result that the piercing means is transferred from the retracted position into the extended position. It is conceivable for the fastening flange to comprise claws that are movable together, approach one another by way of the release mechanism and in this way clamp the cartridge receptacle between one another. Subsequently or at the same time, the fastening flange moves against the fixed release element in order to move the piercing means in the interior of the cartridge receptacle against the membrane of the cartridge.

Preferably, the release mechanism is actuated by manual pivoting of a hand lever about an axis of rotation substantially parallel to the longitudinal axis of the cartridge. In this case, the release mechanism converts the rotary movement of the hand lever about the axis of rotation parallel to the longitudinal axis into a movement in translation substantially parallel to the longitudinal axis by means of a transmission, with the result that the fastening flange is moved in the direction of the release element. This has the advantage that the orientation of the cartridge about its longitudinal axis remains constant, such that, in particular, the position of the product identifier relative to the identifier detector does not change.

According to a further preferred embodiment of the present invention, provision is made, temporally before, during or after the insertion of the cartridge system into the holder and/or the injection of compressed air into the cartridge and/or the injection of the diluent into the mixing chamber and/or the shifting of the fastening flange with respect to the release element, for the product identifier to be read by the identifier detector. The read product identifier is preferably evaluated by an evaluation unit, wherein the injection of the compressed air and/or of the diluent and/or the shifting of the fastening flange with respect to the release element takes place only when the product identifier can be verified by the evaluation unit. This ensures that the dispenser can be put into operation only with known cartridge systems or cartridge systems that are certified for the dispenser, and so damage to the dispenser or a risk of injury to the user on account of the accidental use of incorrect cartridge systems which, for example, cannot withstand the pressure are avoided.

It is also conceivable for the properties of the injected diluent and in particular the temporal profile of the volumetric flow, overall volume, pressure, delivery pauses, temperature and/or carbonation of the injected diluent to be controlled depending on the verified product identifier. Alternatively or additionally, the properties of the injected compressed air and in particular the temporal profile of the volumetric flow, overall volume, delivery pauses and/or pressure of the injected compressed air are also controlled depending on the verified product identifier. Preferably, the ratio between the volumetric flow of the diluent and the volumetric flow of the compressed air is also controlled depending on the verified product identifier. Embedded in the product identifier are in particular all parameters and/or variables of the beverage production process that are settable by the dispenser, such that the dispenser obtains all the information from the cartridge which is necessary or at least helpful for the production of the particular beverage. It is also conceivable for this information to be stored in an internal memory of the dispenser and to be retrieved with the aid of the product identifier for the particular cartridge, and to be used to control the subsequent beverage production process as soon as the presence of this cartridge in the holder is detected.

Yet another subject of the present invention or a further preferred embodiment of the method is a or the abovementioned method for producing a beverage or foodstuff in which, in order to influence the foam on the beverage or foodstuff, the volumetric flow of a solvent, in particular water, is controlled or regulated.

The statements made with regard to this subject of the present invention apply equally to the other subjects and vice versa.

According to the invention, the volumetric flow is regulated or controlled in order to influence the foam on the beverage or foodstuff. For example, the quantity of foam, in particular measured as foam level, can be influenced such that, during the production of the beverage or foodstuff, more or less foam arises. Alternatively or additionally, quality of the foam can be changed by regulating or controlling the volumetric flow of the solvent. In particular, it is possible to create bubbles that are small on average and thus a more stable foam, or bubbles that are larger on average and thus a more unstable foam.

Preferably, a means is provided which senses at least one parameter of the foam, for example the level thereof. On the basis of the signal from this means, the volumetric flow of the solvent is then regulated or controlled. For example, the means is a camera. Alternatively or additionally, however, it is also possible for a volumetric flow profile that is fixed for the particular substrate to be followed.

For example, the solvent is metered in particular into a mixing chamber or the cartridge itself in an intermittent manner. In the mixing chamber or in the cartridge, the solvent is mixed with the substrate.

According to a preferred embodiment of the present invention, the substrate in the cartridge is metered proportionally or non-proportionally to the volumetric flow of the solvent.

Yet a further embodiment according to the invention or preferred embodiment of the present invention relates to a method in which, in order to influence a level of foam on the beverage or foodstuff, the inclination of a container, in which the beverage or foodstuff is collected, is changed.

The statements made with regard to this subject of the present invention apply equally to the other subjects of the present invention and vice versa.

Preferably, the inclination is controlled and/or regulated as a function of time and/or of the filling level in the container.

BRIEF DESCRIPTION OF THE DRAWINGS

In the following text, the invention is explained by way of FIGS. 1 to 9b. These explanations are merely by way of example and do not limit the general concept according to the invention. The explanations apply to the cartridge according to the invention and to the system according to the invention equally.

FIGS. 8a and 8b show a piercing means of the cartridge receptacle of the system according to the second embodiment of the present invention.

DETAILED DESCRIPTION

Figure 1:
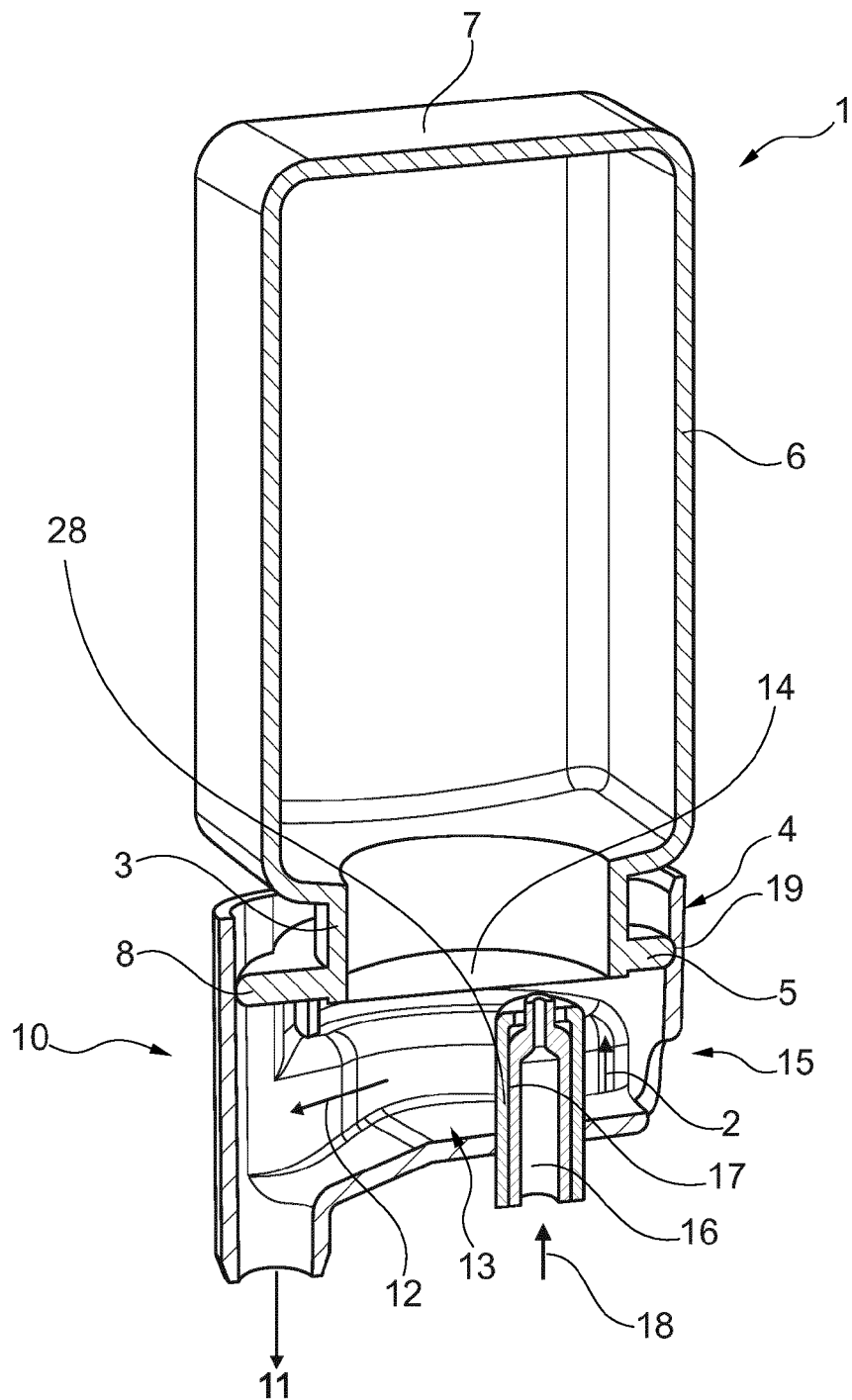
FIG. 1 shows the cartridge and the cartridge receptacle of the system according to a first embodiment of the present invention.

FIG. 1 shows a cartridge system which consists of a cartridge 1 and a cartridge receptacle 10. The cartridge 1 is manufactured preferably from a plastic material, for example by injection-molding or by a blow-molding technique. The cartridge 1 has an, in the present case square, wall region 6, the in this case upper end of which is adjoined by a bottom region 7.

The wall region 6 and the bottom region 7 delimit a cavity in which the beverage substrate and/or foodstuff substrate, in particular a concentrate, is located, with which a beverage or foodstuff can be produced. At the opposite end of the wall region 6 from the bottom region 7, in this case the lower end, a connecting region 4 is provided, which in the present case has a neck 3 and a flange 5. The cavity of the cartridge 1 is hermetically sealed by a closure, in this case a membrane 14, after it has been filled. The membrane 14, in particular a plastic foil is connected to the flange 5 preferably cohesively, in particular by sealing. By way of the connecting region 4, the cartridge 1 is connected to a cartridge receptacle 10. Optionally, a positioning and/or covering means 8, which in the present case is provided as a protuberance, in particular as a lug-like protuberance, is provided on the flange 5. The lug is in this case integrally formed on the flange 5. Furthermore, the cartridge system has a cartridge receptacle 10. The cartridge receptacle 10 has an inflow 15 for a diluent (also referred to as solvent), which preferably comprises water, and a mixing chamber 13 in which the diluent and the beverage substrate and/or foodstuff substrate are mixed together. The direction of flow of the mixture is indicated by the arrow 12. The finished beverage/foodstuff leaves the mixing chamber 13 through the outflow 11 and is collected in a container (not illustrated), for example a drinking glass. Furthermore, the cartridge receptacle 10 has a piercing means 16, in this case a spike, which pierces the membrane 14, which is sealed to the flange region 5 of the cartridge 1, such that the beverage substrate or foodstuff substrate can flow into the mixing chamber 13 in particular along the outer face of the spike, which is provided preferably with lateral channels 17 on its outer side for this purpose.

In order to pierce the membrane 14, the cartridge 1 and/or the cartridge receptacle 10 are moved together in a relative manner and longitudinally such that the spike 16 penetrates the membrane 14. Alternatively, the spike 16 is mounted in a longitudinally displaceable manner in a spike guide 28 of the cartridge receptacle 10, such that no relative movement between the cartridge receptacle 10 and the cartridge 1 is necessary, but rather only the spike 16 is transferred from a retracted position, in which it is away from the membrane 14 (see FIG. 1), into an extended position, in which it pierces the membrane 14 and projects into the cavity.

The flow of the substrate into the mixing chamber 13 can be accelerated and controlled in a targeted manner by gas which is pushed into the cavity of the cartridge 1 through a duct 18 in the piercing spike 16. For example, the pressure in the cartridge 1 and thus the volumetric flow of the substrate can be adapted to the volumetric flow of the solvent. This can be of interest in particular when, in order to influence the formation of foam, the volumetric flow of the solvent is controlled or regulated in a targeted manner. The volumetric flow of the substrate is then preferably adapted to the volumetric flow of the solvent.

Preferably, the flange 5 of the cartridge 1 cooperates in a sealing manner with the cartridge receptacle 10 and as a result ensures that liquid leaves the mixing chamber 13 only through the outflow 5. Furthermore, it is apparent in particular from these figures that the protuberance 8 in the present case is not only a positioning means but also covers the outflow 11 in the cartridge receptacle in particular in a sealing manner. The flange 8 and the protuberance 8 provided thereon can cooperate in a sealing manner, by way of their end face and/or by way of their circumference, with corresponding faces of the cartridge receptacle.

Figure 2:
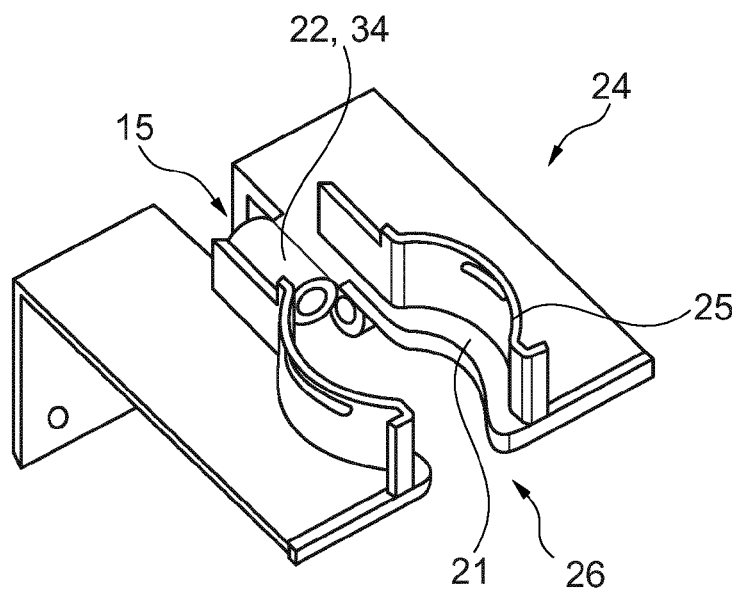
FIGS. 2-5 show a dispenser and a system according to the first embodiment of the present invention.
Figure 3:
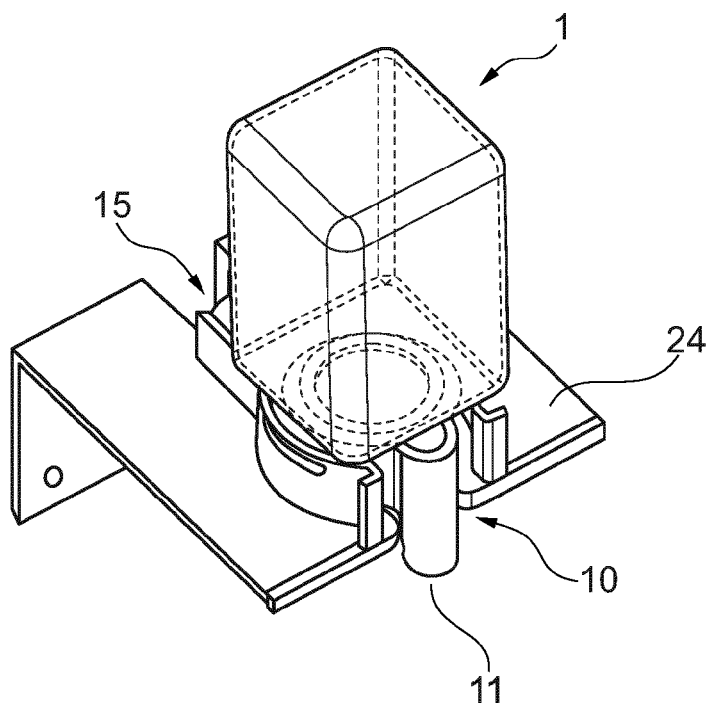
Figure 4:
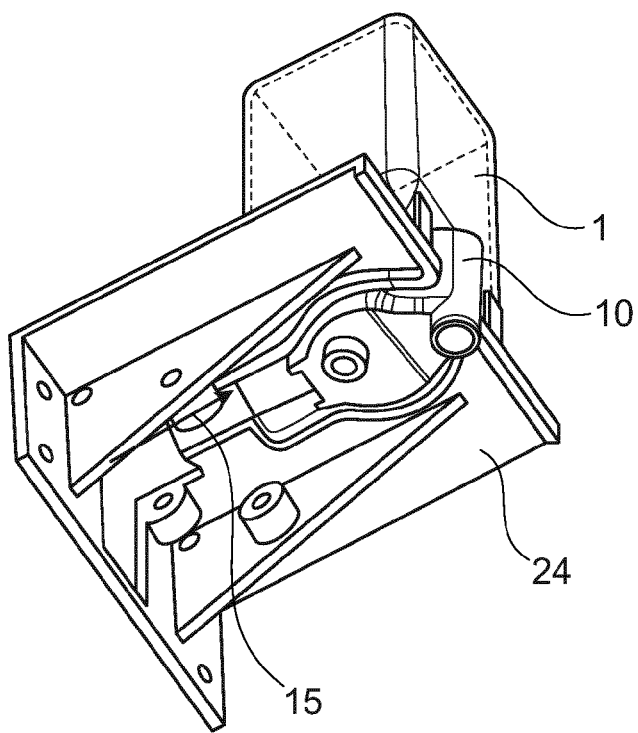
Figure 5:
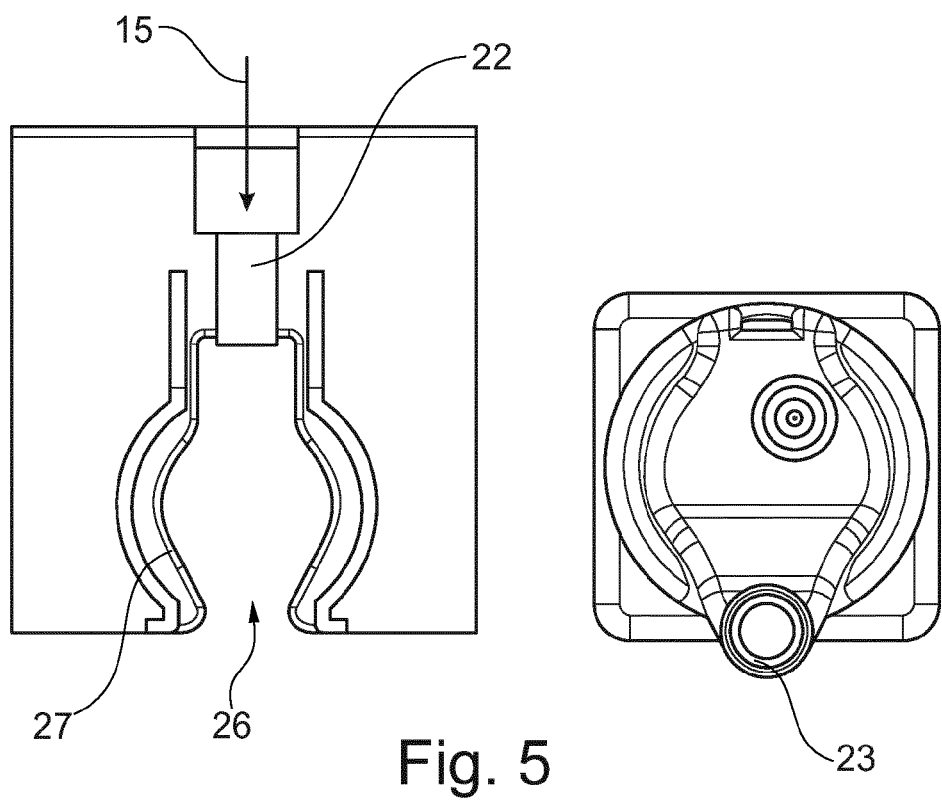

FIGS. 2 to 5 show the holder 24 of the dispenser, and the system according to the first embodiment. FIG. 2 illustrates the holder 24, into which the cartridge system shown in FIG. 1 and in particular the cartridge receptacle 10 of the cartridge system is insertable, without the cartridge system. In FIGS. 3 and 4, the cartridge system has been inserted into the holder 24. In FIG. 5, the cartridge system and the holder 24 are illustrated separately from one another.

The holder 24 has a cutout 26 which at least partially receives the cartridge receptacle 10. It can be seen in particular from FIG. 4 that that part of the cartridge receptacle 10 that reaches into the cutout 26 can cooperate in a form-fitting manner therewith. FIGS. 2 and 3 furthermore illustrate particularly clearly that the cutout 26 extends as far as the edge of the holder 24, such that an opening arises there, into which the outflow 11 of the mixing chamber 13 projects. As a result, a first twist prevention means is provided. Furthermore, the holder 24 can have a guide 25 which cooperates with the circumference of the cartridge receptacle 10 in a form-fitting manner and supports the cartridge in particular against tilting out of the vertical. This guide 25, too, can have a cutout out of which the outflow 11 can project. Here too, the outflow 11, in conjunction with the guide, prevents the cartridge receptacle 10 from turning relative to the holder 24. Preferably, the holder 24 has a pipe 22 as liquid connection, which is connected to a solvent reservoir (also referred to as reservoir for the diluent or fluid source). When the cartridge receptacle 10 is inserted into the holder 24, a fluidic connection between the pipe 22 and an inflow 15 of the cartridge receptacle 10 is created, with the result that the diluent flowing in via the pipe 22 passes into the mixing chamber 13.

The outflow 11 of the cartridge receptacle 10 can be provided in a pivotable manner in order in particular to change the angle at which the jet of finished beverage or foodstuff flows into the vessel. If the jet is conveyed for example in the direction of the wall of a container which receives the finished beverage or foodstuff, it is possible as a result to reduce for example formation of foam. Alternatively or additionally, a support on which the container stands can be tilted such that, in turn, the angle at which the jet of the finished beverage or foodstuff strikes the wall is changed. It is also possible in this way to influence the formation of foam.

Figures 6A, 6B, 6C:
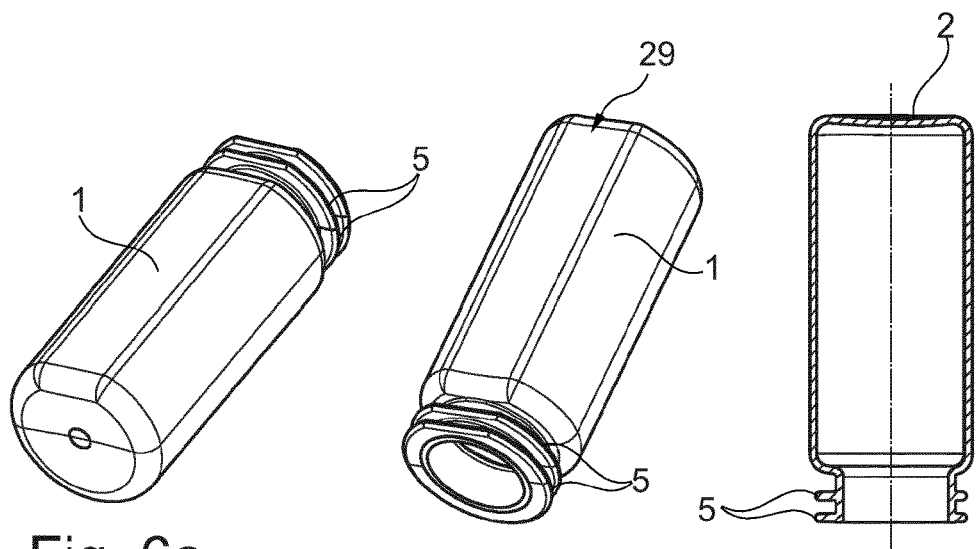
FIGS. 6a to 6c show a cartridge of a system according to a second embodiment of the present invention.

FIGS. 6a to 6c show schematic views of the cartridge 1 of the cartridge system of the system according to an exemplary second embodiment. It is apparent that the cartridge 2 comprises a bottle-like object with rounded corners, flattened longitudinal sides and a cartridge opening on an opposite side from the bottom region 7 along the longitudinal axis of the cartridge 1. In the region of the cartridge opening, the cartridge 1 has two circumferential retaining flanges 5 onto which the cartridge receptacle 10 is clip-fastened. One side of the cartridge 1 of the otherwise round or rounded cartridge 1 has a flattened region 29. In the flattened region, preferably the product identifier is applied.

Figures 7A, 7B:
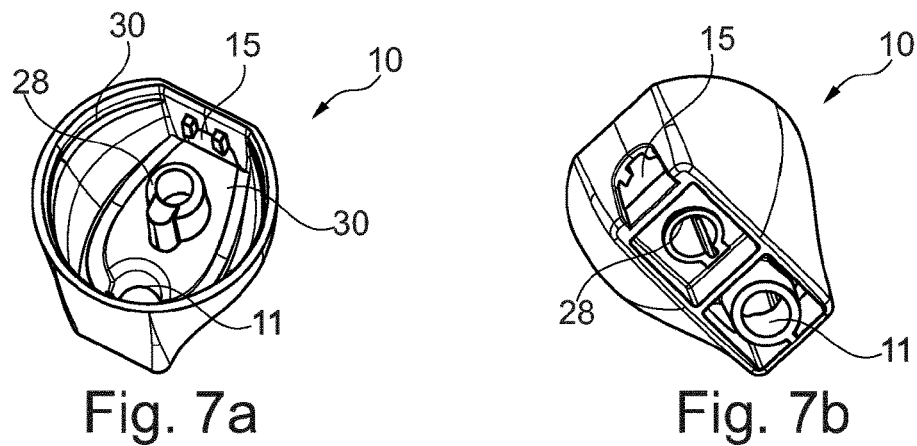
FIGS. 7a to 7c show a cartridge receptacle of the system according to the second embodiment of the present invention.
Figure 7C:
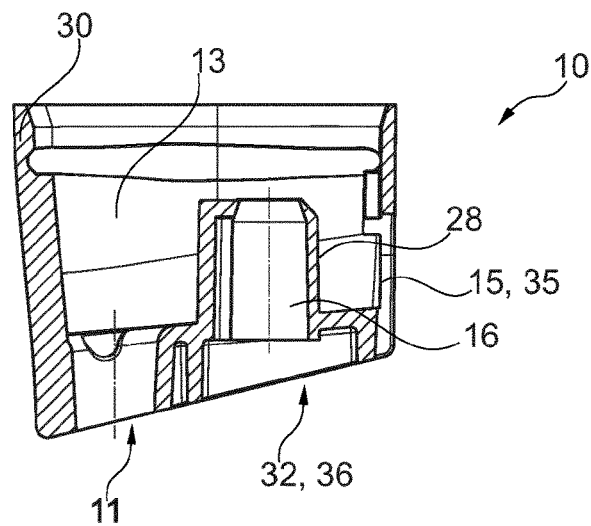

FIGS. 7a, 7b and 7c show schematic views of a cartridge receptacle 10 of the cartridge system of the system of the exemplary second embodiment of the present invention. The cartridge receptacle 10 has, on both sides, an at least partially circumferential latching strip 30 by way of which the cartridge receptacle 10 is clip-fastened onto the retaining flanges 5 of the cartridge 1. Furthermore, the cartridge receptacle 10 has the mixing chamber 13, in the rear side of which the inflow 15 is formed in the form of a simple passage opening in the wall of the cartridge receptacle 10. The inflow 15 is intended to be connected to a pipe 22 which is fluidically connected to the water reservoir, as soon as the cartridge system is inserted into the holder 24. In this way, optionally cooled and/or carbonated water can flow from the dispenser into the mixing chamber 13. On the front side, the beverage outflow 11 is formed in the bottom of the mixing chamber 8. The bottom of the mixing chamber 8 forms, in the direction of the beverage outflow 11, a continuously deepening recess such that, following completion of the beverage production process, no liquid residues remain in the mixing chamber 13. Additionally, the spike guide 28, in which the piercing means 16 illustrated in FIGS. 8a and 8b is mounted in a displaceable manner, can be seen virtually centrally within the mixing chamber 13 in FIGS. 7a to 7c.

For this purpose, the spike guide 80 comprises a guide part with an internal guide channel in which the piercing spike is accommodated in a displaceable manner. The guide channel is formed in a substantially cylindrical manner and protrudes virtually perpendicularly from the bottom of the mixing chamber 13 in the direction of the cartridge 1. Formed at an end of the guide part that faces the cartridge 1 is a circumferential stop with a reduced diameter, against which a circumferential shoulder of the piercing spike butts when the piercing spike 16 arrives in the extended position. The stop thus limits the movement of the piercing spike 16 in the direction of the cavity 6. Optionally arranged on the bottom of the mixing chamber 13 are mixing structures which cause the water flowing in to swirl and thus improve the blending of the substrate and the water.

FIGS. 8a and 8b illustrate detailed views of the piercing means 16 (also referred to as piercing spike) of the cartridge receptacle 10 of the system according to the second exemplary embodiment of the present invention.

The piercing spike 16 is configured to be arranged in a longitudinally displaceable manner in the spike guide 28. It is thus transferable from a retracted starting position, in which the piercing means 16 is away from the membrane 14, into an extended position, in which the piercing means 16 pierces the membrane 14 and projects into the cavity of the cartridge 1.

The piercing means 16 is transferred from the retracted position into the extended position by means of a release element of the dispenser.

Integrated into the piercing spike 16 is the compressed-air line 31 (also referred to as duct 22) that extends along the piercing spike 16. The compressed-air line 31 extends virtually centrally within the piercing spike 16 from a first end of the piercing spike 16 to a second end of the piercing spike 16. At the first end of the piercing spike 16, a compressed-air connection 40, accessible from outside the cartridge receptacle 10, of the compressed-air line 31 is formed, said compressed-air connection 40 being intended to be connected to a compressed-air outlet 32, fluidically connected to a compressed-air source of the dispenser, on the holder 24. Formed at the second end is a compressed-air outlet of the compressed-air line 31 for blowing the compressed air into the cavity of the cartridge 1 when the piercing spike 16 is in the extended position, with the result that the substrate is then pushed into the mixing chamber 13.

The system is configured such that the compressed-air connection 40 of the piercing means 16 is immediately coupled to the compressed-air outlet 32 of the holder 24 as soon as the cartridge receptacle 10 has been inserted into the holder 24 and/or a release mechanism for the fastening flange is actuated.

The outer wall of the piercing means 16 is configured with a plurality of and in particular precisely five lateral channels 17, extending virtually parallel to one another, for conveying the substrate in the direction of the mixing chamber 13 when the membrane 14 is pierced. Through the lateral channels formed laterally on the piercing means 16, the substrate can then flow past the membrane 14 in the direction of the mixing chamber 13. The lateral channels 17 are each configured in the form of a groove that is open on one side. It is conceivable for the cross section of the lateral channels and/or the number of the lateral channels to be adapted to the viscosity of the substrate, such that the lateral channels 17 control or limit the flow of the substrate in the direction of the mixing chamber 13. The piercing spike 16 is preferably configured as a plastic part and particularly preferably as an injection-molded plastic part.

Figure 9A:
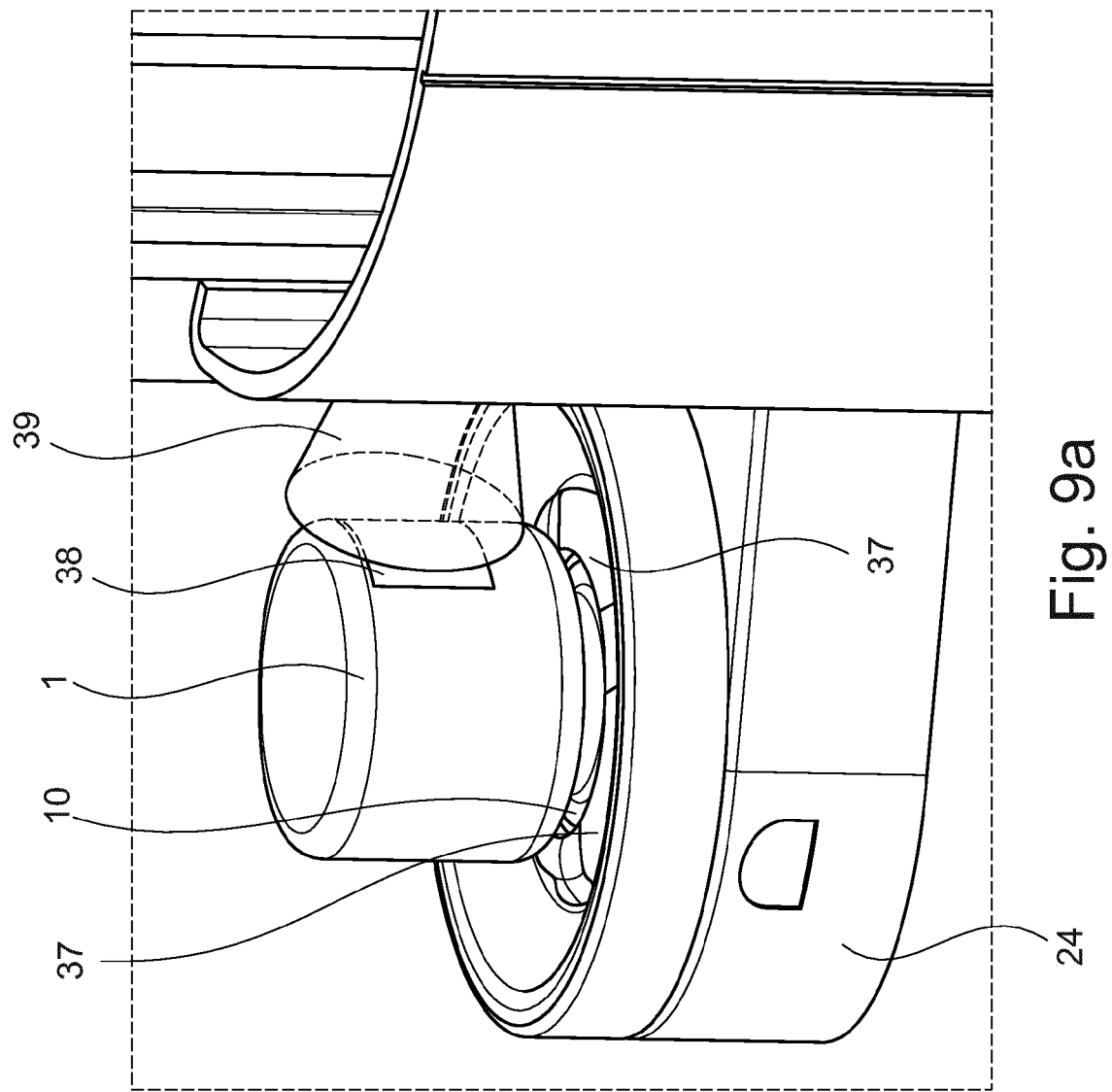
FIGS. 9a and 9b show a dispenser and a system according to a third embodiment of the present invention.
Figure 9B:
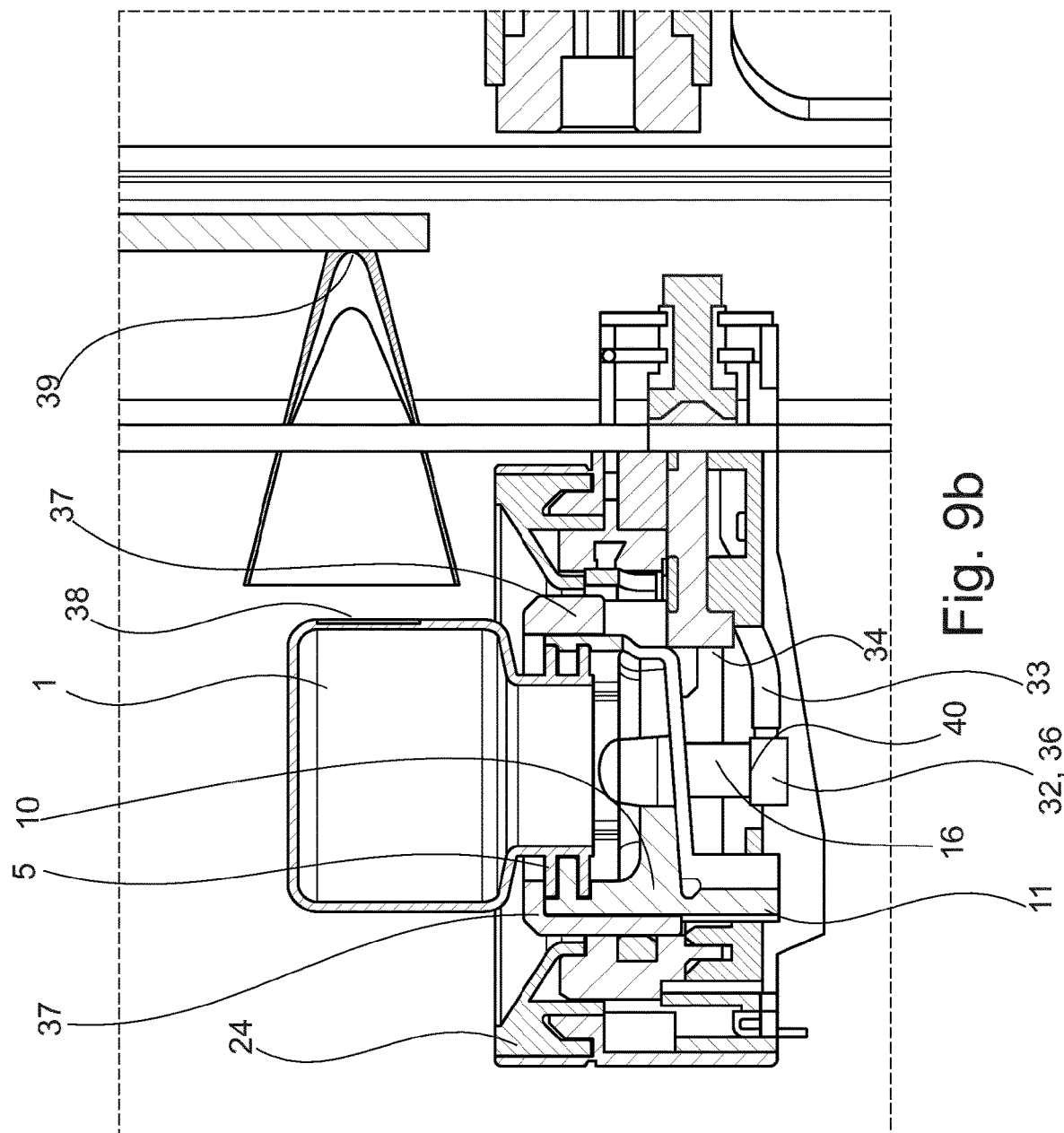

FIGS. 9a and 9b now illustrate a dispenser and a system according to a third embodiment of the present invention.

The system comprises a cartridge system consisting of the cartridge 1 explained with reference to FIGS. 6a to 6c and the cartridge receptacle 10 explained with reference to FIGS. 7a to 8b. The cartridge 1 and cartridge receptacle 10 are connected together, in particular clip-fastened.

The dispenser of the system comprises a holder 24 into which the cartridge system is inserted manually by the user.

The holder 24 comprises the compressed-air outlet 32, which, following the insertion of the cartridge system into the holder 24, enters into a fluidic connection with the compressed-air connection 40 on the piercing means 16 of the cartridge receptacle 10. The compressed-air outlet 32 of the dispenser is connected via a flexible line 33 to a compressed-air source of the dispenser, for example to a compressor in the interior of the housing of the dispenser, such that the compressed-air line 31 in the interior of the piercing means 16 is pressurized. It is also conceivable for the compressed-air source of the dispenser to comprise an exchangeable gas cartridge. The compressed-air outlet 32 is configured as a fixed element and thus comprises at the same time the release element, which transfers the piercing means 16 from its retracted starting position into the extended position, in which it pierces the membrane 14 and the compressed-air outlet is arranged within the cavity of the cartridge 1.

The holder 24 also has the liquid connection 35 (also referred to as pipe 22 in FIG. 2), through which water from a water reservoir of the dispenser is fed to the water inflow 15 of the cartridge receptacle 10. The water reservoir comprises in particular a removable water tank, from which water is removed by means of one or more pumps and fed under pressure to the water inflow 15. Preferably, the connection between the fluid feed and the water inflow 15 is established directly as soon as the cartridge system is inserted into the holder 24. Before being fed to the water inflow 15, the water from the water tank is optionally also carbonated (i.e. carbonic acid is added) within the dispenser by means of a carbonator and/or cooled by means of a cooling unit. The cooling unit comprises in particular a cooling circuit with a compressor and is likewise integrated into the housing of the dispenser, as is the carbonator.

The holder 24 also comprises a fastening flange 34, which engages around the cartridge receptacle 10 in a form-fitting and/or force-fitting manner upon insertion into the holder. The fastening flange 34 to this end comprises at least two claws 37 which engage radially around the cartridge receptacle 10. The holder 24 also has a release mechanism for actuating the fastening flange 34. The release mechanism comprises for example a hand lever, to be actuated manually by the user, on the holder 24, said hand lever being pivotable about an axis of rotation substantially parallel to the longitudinal axis of the cartridge 2 when it is actuated. The hand lever is coupled to the claws 37 of the fastening flange 34 via a transmission such that, as a result of the pivoting of the hand lever, the claws 37 are moved toward one another and receive or clamp the cartridge receptacle 10 between one another in a form-fitting manner.

At the same time, the transmission converts the rotary movement of the hand lever into a downward linear movement in translation of the fastening flange 34, such that the entire cartridge system is lowered. The cartridge receptacle 10 is thus moved relative to the fixed release element 36 such that the piercing means 16 butts against the release element 36, with the result that the piercing means 16 is moved from the retracted position into the extended position. As a result, the membrane 14 is perforated. It is also conceivable for the fluidic connection between the compressed-air outlet 32 and the compressed-air connection 40 to be established only as a result of the cartridge receptacle 10 being lowered relative to the release element 36. The transmission produces the conversion and lowering movement by way of a screw jack.

As a result of the compressed air being introduced into the cavity and the water being introduced into the mixing chamber 13, the beverage production process is now initiated and the beverage produced in the mixing chamber 14 can pass through the outflow 11 into a drinking vessel arranged beneath the outflow 11 on a support of the dispenser. The support is provided in particular in a pivotable and/or vertically adjustable manner.

In its flattened region 28 facing the housing of the dispenser, the cartridge 1 has the product identifier 38. The product identifier 38 in this case comprises a QR code in which information about the substrate present in the cavity is embedded. Arranged on the opposite side on the housing of the dispenser is an identifier detector 39 in the form of an optical camera, in particular a CCD camera. The QR code is detected by the optical camera and evaluated by means of an evaluation unit of the dispenser. In this way, the dispenser recognizes which type of cartridge 1 and/or substrate the cartridge system inserted into the holder 24 is. On the basis of this information, information about the preparation of the beverage with the aid of the substrate located in the cartridge 1 can optionally be loaded from an internal memory of the dispenser. In particular, nominal values for the temporal and absolute profile of the volumetric flow, the temperature, the pressure and/or the carbonation of the injected water, or the temporal and absolute profile of the volumetric flow and/or the pressure of the injected compressed air are specified thereby. It is also conceivable for the ratio between the volumetric flow of the diluent and the volumetric flow of the compressed air to be controlled depending on the verified product identifier, in order, in the case of the beverage produced, to achieve the optimal results in terms of appearance and taste for the particular cartridge type.

Following the production of the beverage, the hand lever can be pivoted back by the user, with the result that the cartridge system is raised again. The cartridge system released in this way can now be removed from the dispenser and disposed of or recycled.

The present teachings envision any of the following features of a dispenser in any combination: the dispenser has a cartridge holder, the cartridge holder has at least one guide and/or twist prevention means for a cartridge and/or a cartridge receptacle; the cartridge holder has a cutout which at least partially receives the cartridge and/or the cartridge receptacle; the cutout and the cartridge or cartridge receptacle cooperate at least partially in a form-fitting manner; the holder has a guide which cooperates with the circumference of the cartridge receptacle; the cutout and/or the guide have an opening for a protrusion on the cartridge receptacle; the holder has a liquid connection; the holder has a compressed-air outlet connected to a compressed-air source; the holder has a release element in order to transfer a piercing means of the cartridge receptacle from a retracted position into an extended position; the holder comprises a fastening flange which engages around the cartridge receptacle in a form-fitting and/or force-fitting manner during or after insertion into the holder; the fastening flange comprises a release mechanism which is configured such that actuation of the release mechanism results in the fastening flange engaging around the cartridge receptacle and/or in the fastening flange being shifted such that a relative movement between the cartridge receptacle and the release element in contact with the piercing means is generated, with the result that the piercing means is transferred from the retracted position into the extended position, the release mechanism comprises a hand lever for the manual actuation thereof; the hand lever is configured to be rotatable about an axis of rotation substantially parallel to the longitudinal axis of the cartridge; the release mechanism comprises a transmission which converts a rotary movement of the hand lever about the axis of rotation parallel to the longitudinal axis into a movement in translation substantially parallel to the longitudinal axis, such as raising or lowering of the cartridge receptacle; the dispenser has an identifier detector for reading a product identifier on the cartridge and/or the cartridge receptacle; the identifier detector is arranged above and/or behind the holder; the dispenser has a support for a container in which the finished beverage or foodstuff is collected; and the support is intended to be pivotable and/or vertically adjustable.

The present teachings envision any of the following features of a system in any combination: the system having a dispenser as disclosed herein, and a cartridge receptacle and/or a cartridge the cartridge receptacle has an inflow for a diluent, in particular water, a mixing chamber in which the diluent and a beverage substrate and/or foodstuff substrate are mixed, and an outflow; with regard to the direction of flow of the diluent, the flow cross section is preferably first expanded and then reduced again; the mixing chamber has a protuberance; the outflow is provided in the protuberance; the cartridge is closed by means of a membrane, and in that the cartridge receptacle has a piercing means for perforating the membrane; the cartridge receptacle has a spike guide in which the piercing means is mounted in a displaceable manner; the piercing means is displaceable between a retracted position, in which the piercing means is away from the membrane, and an extended position, in which the piercing means pierces the membrane of the cartridge and projects into the cartridge; at least one lateral channel for conveying the beverage substrate and/or foodstuff substrate in the direction of the mixing chamber when the membrane is pierced by the piercing means has been introduced into the outer wall of the piercing means; a compressed-air line is integrated into the piercing means; a compressed-air connection of the compressed-air line for connecting to a compressed-air source is formed on a side of the piercing means that is remote from the cartridge, the compressed-air connection being accessible in particular from outside the cartridge receptacle; a compressed-air outlet of the compressed-air line for blowing the compressed air into the cartridge is formed on a side of the piercing means that faces the cartridge; the system is configured such that the compressed-air connection is coupled to the compressed-air outlet of the holder when the cartridge receptacle has been inserted into the holder and/or the release mechanism for the fastening flange is actuated; the inflow and the outflow are provided at opposite ends of the cartridge receptacle; the piercing means is provided in a manner aligned with the inflow and the outflow; a cartridge is provided on or in the cartridge receptacle; the cartridge has a wall region, one end of which is adjoined by a connecting region which is closed, in particular by the membrane, and at the opposite end of which optionally a bottom region is provided; the wall region and optionally the bottom region define a cavity which accommodates a beverage substrate and/or foodstuff substrate; the connecting region has at least one flange which is provided with a positioning means and/or covering means; the positioning means and/or covering means is an indentation and/or protrusion which protrudes from the flange, in particular the circumference thereof; a neck is provided between the wall region and the connecting region; the membrane is fastened, in particular sealed to the flange; the cartridge receptacle is fastened, in particular releasably, to the connecting region of the cartridge; the flange cooperates in a sealing manner with the cartridge receptacle; the cartridge and the cartridge receptacle are connected together in a rotationally fixed manner; the covering means covers the outflow of the cartridge receptacle; the cartridge is provided with a product identifier; the product identifier is preferably arranged on a side of the cartridge that faces the identifier detector; and the cartridge has a substantially planar surface portion in the region of the product identifier.

The present teachings envision any of the following steps or features of a method in any combination: the method produces a beverage with a system as disclosed herein; the method includes the following steps: a) inserting a cartridge system made up of a cartridge and cartridge receptacle into the holder, b) establishing a fluidic connection between a fluid source of the dispenser and the inflow of the cartridge receptacle, c) establishing a compressed-air connection between a compressed-air source of the dispenser and a compressed-air connection of the cartridge receptacle, d) perforating the membrane by transferring the piercing means from the retracted position into the extended position, e) transferring the beverage substrate and/or foodstuff substrate from the cartridge into the mixing chamber by injecting compressed air into the cartridge through the compressed-air connection, f) injecting a diluent into the mixing chamber through the inflow, and g) discharging the beverage produced in the mixing chamber by blending the beverage substrate and/or foodstuff substrate with the diluent by means of the outflow; the diluent is cooled and/or carbonated before being injected into the inflow; the piercing means is transferred from the retracted position into the extended position by a release element of the dispenser; the cartridge receptacle is preferably moved against the fixed release element such that the piercing means is transferred from the retracted position into the extended position; during or after the insertion of the cartridge system into the holder, a fastening flange of the holder is operated by a release mechanism that is actuatable manually or by a motor, such that the fastening flange engages around the cartridge receptacle in a form-fitting and/or force-fitting manner, and/or such that the fastening flange is shifted such that a relative movement between the cartridge receptacle and the release element in contact with the piercing means is generated, with the result that the piercing means is transferred from the retracted position into the extended position; the release mechanism is actuated by manual pivoting of a hand lever about an axis of rotation substantially parallel to the longitudinal axis of the cartridge; the release mechanism converts the rotary movement of the hand lever about the axis of rotation parallel to the longitudinal axis into a movement in translation substantially parallel to the longitudinal axis by means of a transmission, with the result that the fastening flange is moved in the direction of the release element; in order to influence the foam on the beverage or foodstuff, the volumetric flow of the diluent is controlled or regulated; the solvent is metered intermittently; the substrate in the cartridge is metered proportionally or non-proportionally to the volumetric flow of the solvent; in order to influence a level of foam on the beverage or foodstuff, the inclination of a container, in which the beverage or foodstuff is collected, is changed; the inclination is controlled and/or regulated as a function of time and/or of the filling level in the container; temporally before, during or after the insertion of the cartridge system into the holder and/or the injection of compressed air into the cartridge and/or the injection of the diluent into the mixing chamber and/or the shifting of the fastening flange with respect to the release element, the product identifier is read by the identifier detector; the read product identifier is evaluated by an evaluation unit and the injection of the compressed air and/or of the diluent and/or the shifting of the fastening flange with respect to the release element takes place only when the product identifier can be verified by the evaluation unit; the properties of the injected diluent and in particular the temporal profile of the volumetric flow, overall volume, pressure, delivery pauses, temperature and/or carbonation of the injected diluent are controlled depending on the verified product identifier; and the properties of the injected compressed air and in particular the temporal profile of the volumetric flow, overall volume, delivery pauses and/or pressure of the injected compressed air are controlled depending on the verified product identifier.

LIST OF REFERENCE SIGNS

1 Cartridge
2 Direction of movement
3 Neck
4 Connecting region
5 Flange
6 Wall region
7 Bottom region
8 Positioning and/or covering means, indentation and/or protuberance
9 Inflow of the substance, piercing means
10 Cartridge receptacle
11 Outflow of substance plus solvent/water
12 Direction of flow of substance plus solvent/water
13 Mixing chamber
14 Closure, membrane
15 Solvent inflow, water inflow
16 Piercing means, spike
17 Outflow channels
18 Gas inlet
19 Seal, collar seal
20 Fastening means, collar
21 Support
22 Duct
23 Indentation and/or protuberance of the cartridge receptacle
24 Holder
25 Guide for the cartridge receptacle
26 Cutout
27 Guide edge
28 Spike guide
29 Flattened region
30 Latching strip
31 Compressed-air line
32 Compressed-air outlet
33 Line
34 Fastening flange
35 Liquid connection
36 Release element
37 Claw
38 Product identifier
39 Identifier detector
40 Compressed-air connection

The invention claimed is:

1. A dispenser having a cartridge holder, the cartridge holder having:
 a) at least one guide, at least one twist prevention means, or both for a cartridge, a cartridge receptacle, or both;
 b) a release element configured to transfer a piercing means of the cartridge receptacle from a retracted position into an extended position;
 c) a liquid connection;
 d) a compressed-air outlet connected to a compressed-air sources
 e) a fastening flame which engages around the cartridge receptacle in a form-fitting manner, a force-fitting manner, or both during or after insertion into the cartridge holder; and
 wherein the fastening flange comprises a release mechanism which is configured such that actuation of the release mechanism results in the fastening flange engaging around the cartridge receptacle and/or in the fastening flange being shifted such that a relative movement between the cartridge receptacle and the release element in contact with the piercing means is generated, with a result that the piercing means is transferred from the retracted position into the extended position.

2. The dispenser according to claim 1, wherein the cartridge holder has a cutout which at least partially receives the cartridge and/or the cartridge receptacle; and
 wherein the cutout and the cartridge receptacle cooperate at least partially in a form-fitting manner.

3. The dispenser according to claim 1, wherein the cartridge holder has a guide which cooperates with a circumference of the cartridge receptacle.

4. The dispenser according to claim 1, wherein the release mechanism comprises a hand lever for a manual actuation thereof.

5. The dispenser according to claim 4, wherein the hand lever is configured to be rotatable about an axis of rotation substantially parallel to a longitudinal axis of the cartridge.

6. The dispenser according to claim 5, wherein the release mechanism comprises a transmission which converts a rotary movement of the hand lever about the axis of rotation parallel to the longitudinal axis into a movement in translation substantially parallel to the longitudinal axis.

7. The dispenser according to claim 6, wherein the movement in translation is raising or lowering of the cartridge receptacle.

8. The dispenser according to claim 1, wherein the dispenser has an identifier detector for reading a product identifier on the cartridge and/or the cartridge receptacle; and
 wherein the identifier detector is arranged above and/or behind the cartridge holder.

9. A system having the dispenser according to claim 1, wherein the system includes the cartridge receptacle and/or the cartridge;
 wherein the cartridge is closed by means of a membrane;
 wherein the cartridge receptacle has the piercing means configured to perforate the membrane;
 wherein the cartridge receptacle has a spike guide, in which the piercing means is mounted in a displaceable manner; and
 wherein the piercing means is displaceable between the retracted position, in which the piercing means is away from the membrane, and the extended position, in which the piercing means pierces the membrane of the cartridge and projects into the cartridge.

10. The system according to claim 9, wherein the cartridge receptacle has:
 a) an inflow for a diluent;
 b) a mixing chamber in which the diluent and a beverage substrate and/or a foodstuff substrate are mixed;
 c) an outflow; and
 wherein, with regard to a direction of flow of the diluent, a flow cross section is first expanded and then reduced.

11. The system according to claim 10, wherein the diluent is water.

12. The system according to claim 10, wherein at least one lateral channel configured to convey the beverage substrate and/or the foodstuff substrate in a direction of the mixing chamber when the membrane is pierced by the piercing means has been introduced into an outer wall of the piercing means.

13. The system according to claim 9, wherein a compressed-air line is integrated into the piercing means;
    wherein a compressed-air connection of the compressed-air line for connecting to the compressed-air source is formed on a side of the piercing means that is remote from the cartridge;
    wherein the compressed-air connection is accessible from outside the cartridge receptacle; and
    wherein a compressed-air outlet of the compressed-air line for blowing a compressed air into the cartridge is formed on a side of the piercing means that faces the cartridge.

14. The system according to claim 13, wherein the system is configured such that the compressed-air connection is coupled to the compressed-air outlet of the cartridge holder when the cartridge receptacle has been inserted into the cartridge holder and/or the release mechanism for the fastening flange is actuated.

15. The system according to claim 9, wherein the cartridge is provided with a product identifier;
    wherein the product identifier is arranged on a side of the cartridge that faces an identifier detector; and
    wherein the cartridge has a substantially planar surface portion in a region of the product identifier.

16. A method for producing a beverage with the system according to claim 9, comprising:
    a) inserting a cartridge system made up of the cartridge and the cartridge receptacle into the cartridge holder;
    b) establishing a fluidic connection between a fluid source of the dispenser and an inflow of the cartridge receptacle;
    c) establishing a compressed-air connection between the compressed-air source of the dispenser and a compressed-air connection of the cartridge receptacle;
    d) perforating the membrane of the cartridge by transferring the piercing means of the cartridge receptacle from the retracted position into the extended position;
    e) transferring a beverage substrate and/or a foodstuff substrate from the cartridge into a mixing chamber of the cartridge receptacle by injecting a compressed air into the cartridge through the compressed-air connection of the cartridge receptacle;
    f) injecting a diluent into the mixing chamber through the inflow; and
    g) discharging the beverage produced in the mixing chamber by blending the beverage substrate and/or the foodstuff substrate with the diluent by means of an outflow of the cartridge receptacle;
        wherein the piercing means is transferred from the retracted position into the extended position by the release element of the dispenser; and
        wherein the cartridge receptacle is moved against the release element such that the piercing means is transferred from the retracted position into the extended position.

17. The method according to claim 16, wherein the diluent is cooled and/or carbonated before being injected into the inflow.

18. The method according to claim 16, wherein temporally before, during, or after the inserting of the cartridge system into the cartridge holder and/or the injecting of the compressed air into the cartridge and/or the injecting of the diluent into the mixing chamber and/or the shifting of the fastening flange with respect to the release element, a product identifier is read by an identifier detector.

* * * * *

UNITED STATES PATENT AND TRADEMARK OFFICE
CERTIFICATE OF CORRECTION

PATENT NO. : 11,274,027 B2  
APPLICATION NO. : 16/368016  
DATED : March 15, 2022  
INVENTOR(S) : Marc Krüger et al.

Page 1 of 1

It is certified that error appears in the above-identified patent and that said Letters Patent is hereby corrected as shown below:

In the Claims

Column 19, Line 62-63, remove "compressed-air sources" and insert --compressed-air source;--

Column 19, Line 64, remove "a fastening flame" and insert --a fastening flange--

Signed and Sealed this
Eleventh Day of October, 2022

Katherine Kelly Vidal
*Director of the United States Patent and Trademark Office*